United States Patent [19]

Readman et al.

[11] Patent Number: 5,719,566

[45] Date of Patent: Feb. 17, 1998

[54] METHOD AND APPARATUS FOR DETECTING DORMANT ACTUATOR FAILURE

[75] Inventors: John Readman; James J. Wrobel; Timothy M. Mayer, all of Rockford, Ill.

[73] Assignee: Sundstrand Corporation, Rockford, Ill.

[21] Appl. No.: 673,389

[22] Filed: Jun. 28, 1996

[51] Int. Cl.[6] .................................................. G08B 21/00
[52] U.S. Cl. .................... 340/945; 244/178; 244/194; 244/213; 244/223; 318/584; 364/424.013
[58] Field of Search .......................... 340/945, 946, 340/967; 73/802; 318/564, 584, 586, 626; 364/424.013; 244/178, 194, 213, 223; 91/509

[56] References Cited

U.S. PATENT DOCUMENTS

| | | | |
|---|---|---|---|
| 3,812,806 | 5/1974 | Korotkov et al. | 244/178 |
| 4,109,886 | 8/1978 | Tribken et al. | 364/424.013 |
| 4,294,162 | 10/1981 | Fowler et al. | 244/223 |
| 4,345,195 | 8/1982 | Griffith et al. | 318/584 |
| 4,472,780 | 9/1984 | Chenoweth et al. | 364/424.013 |
| 4,892,274 | 1/1990 | Pohl et al. | 244/213 |
| 5,406,488 | 4/1995 | Booth | 244/194 |

*Primary Examiner*—Jeffery Hofsass
*Assistant Examiner*—John Tweel, Jr.
*Attorney, Agent, or Firm*—Antonelli, Terry, Stout & Kraus

[57] ABSTRACT

The actuation system of the present invention is based upon sensing relatively small delta errors over relative short strokes as opposed to absolute travel error. An actuation system in accordance with the invention includes an actuator (30, 40, 50, 60, 70, 80, 90 and 100) attached to a structure (C) and an element (20, 21, 22, 23, 24 and 25) to be moved relative to the structure, the actuator causing movement of the element along a path of travel between travel limits (A and B) relative to the structure and having a failure mode when the actuator has moved more than a fixed distance relative to a reference position on the path of travel; a position transducer (34, 44, 54, 65, 74, 84, 94 and 104), coupled to the structure and to the element, for producing an output signal representing a position of the element along the path of travel, the position transducer having a position resolution error along the path of travel greater than the fixed distance; a processor (200), coupled to the output signal, for sampling the output signal periodically a plurality of times during the movement of the element along the path of travel and in response to samples producing a signal indicating if a failure mode has occurred and wherein a sampling rate of the periodic samples is chosen so that a distance that the actuator travels between successive samples times the position resolution error is less than the fixed distance.

30 Claims, 10 Drawing Sheets

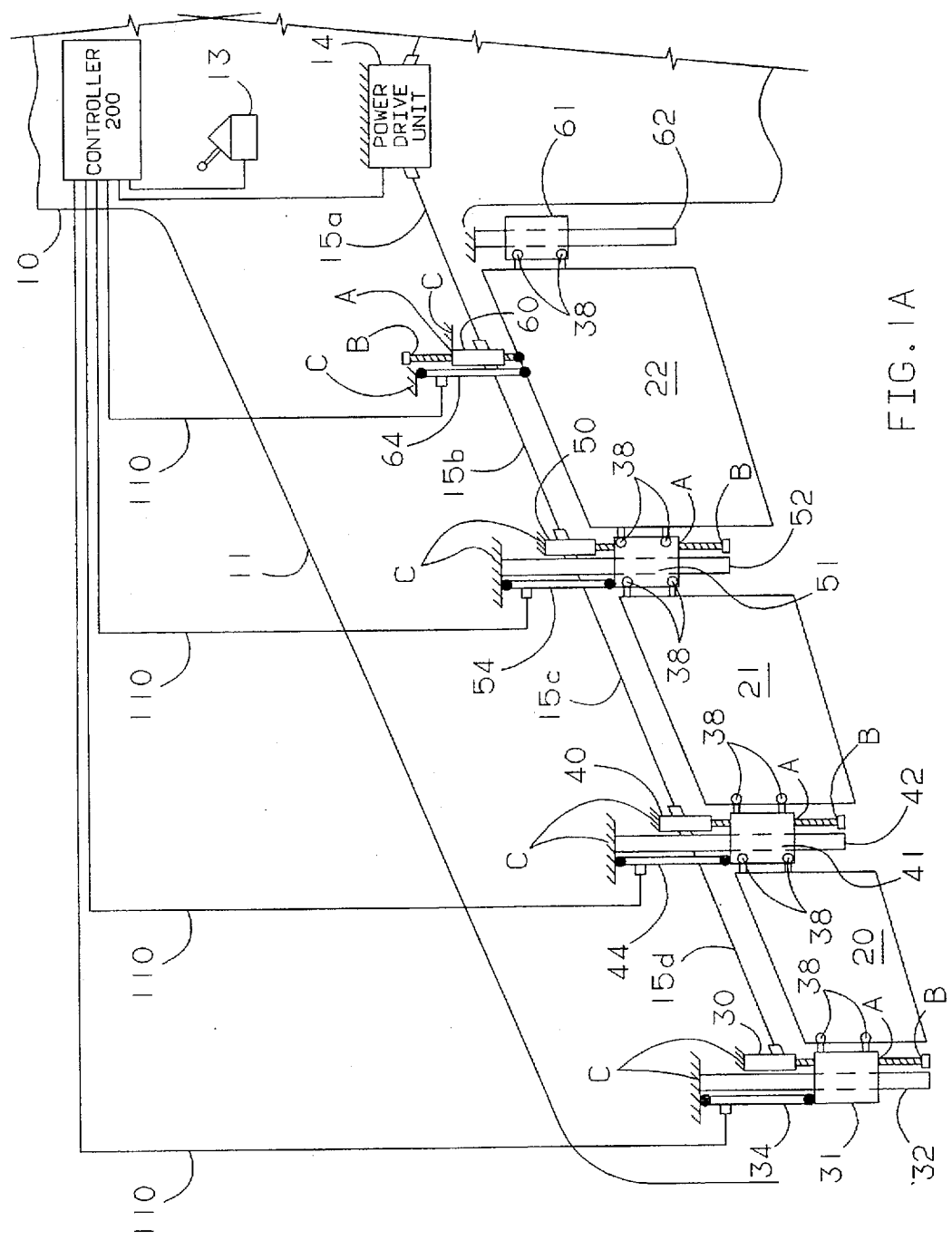

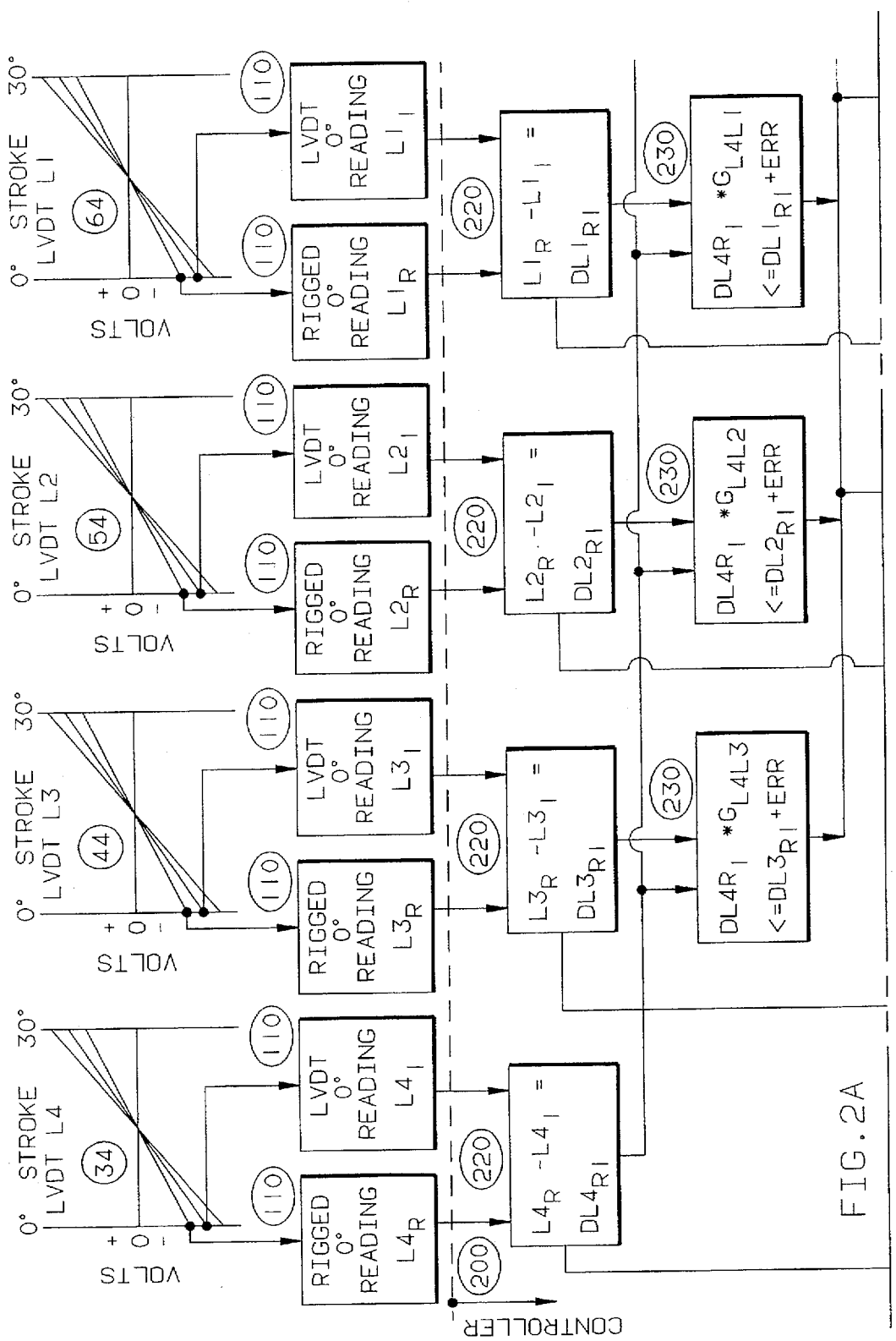

METHOD AND APPARATUS FOR DETECTING DORMANT ACTUATOR FAILURE

TECHNICAL FIELD

The present invention relates to methods and apparatus for determining malfunction of mechanical actuators, and more particularly, to aircraft in-flight equipment monitoring devices.

BACKGROUND ART

Aircraft typically include a plurality of flaps arranged side by side on each wing for simultaneous actuation. Flap actuators are disposed generally in parallel at each side of the flaps. Also, to save weight and expense, as well as to provide operational redundancy for safety, a single actuator may be disposed between and connected to two adjacent flaps. Thus, three actuators may service two flaps, four actuators may service three flaps, etc.

These actuators are intended to move and hold the flaps in desired locations against aiding and/or resisting loads during aircraft operation. For example, full extension of the flaps to cause landing descent applies a high resisting load to the flaps. Normally, the flap actuators all operate in unison and precisely position the flaps according to control signals from the flight deck. However, in a parallel actuator system, if any one actuator becomes inoperative, the remaining adjacent actuator connected to that flap is typically sufficient to continue flap positioning, so much so that failure of the single actuator may not be readily noticeable in flight. In this way, a single defective actuator is said to be "dormant".

However, failure of a second, adjacent actuator can lead to an unacceptable loss of flap control. If, for example, the flap with failed actuators then moves with the load on the wing while a flap on another wing properly moves against the load as commanded by the flight deck, the aircraft can experience a catastrophic roll. Under flight conditions, that free movement can be destructive of other wing components. Thus, it is important to detect the failure of a single, dormant actuator at the earliest opportunity.

Previously, it has been suggested to detect dormant flap actuators by mounting a LVDT (linear variable displacement transducer) in connection with the flap actuation system. Relative motion between components of the wing structures and the flaps is measured by the LVDT to provide electronic signals indicative of error in position and/or movement. One such system is currently employed on Boeing 777 aircraft. In operation, the failure detection system determines the initial, rigged position of each LVDT in the zero flap position after final assembly and then determines the operating position of the flap in flight by measuring the output of the LVDT. A failure signal is provided if that LVDT output signal is outside of predetermined acceptable parameters. Upon receiving such a failure signal, the flap actuation system can be shut down, for example, to not risk a second actuator failure and the aircraft may instead land by extending the slats rather than the flaps.

Unfortunately, such absolute measurement techniques typically require extremely precise and expensive equipment. Flap deflection in the event of a single actuator failure mode can be as slight as 0.03 inch. Typical LVDT's have a signal error proportional to the length of travel. However, since typical LVDT errors can be ±0.5–1.0%, over a typical six inch half stroke between the null and operating positions, LVDT accuracy ranges ±0.030–0.060 inch. Thus, the failure mode of a flap detection of 0.03 inches can go undetected within the potential error range. To overcome this difficulty it has been previously suggested to use more accurate LVDT's, having only ±0.2% error over the stroke. However, such LVDT's are significantly more expensive.

Moreover, such systems may require careful initial rigging and calibration with periodic adjustment caused by normal actuator drift, temperature fluctuations, variable airspeed effects, etc. Further, such prior systems function best with low flap gains since high gains multiply the apparent deflection caused by LVDT error. Since LVDT gains are typically imposed by installation constraints, requiring low gain can significantly complicate sensitivity of the system. Also, prior systems have been found to be susceptible to extraneous failure signals caused by factors other than actuator failure.

Furthermore, it is desirable to check the operational status of the drive lines which provide rotary power to each of the actuators which move the wing panels. Currently, a RVDT (rotary velocity displacement transducer) may be mounted at the outboard end of each of the drivelines to provide a signal representative of the operation of the drive line. Unfortunately, this system utilizes transducers which have no additional functions and added cost and weight to the airframe.

DISCLOSURE OF THE INVENTION

The present invention provides an improved method and apparatus for detecting actuator failure. An actuator system in accordance with the invention is:

1. reliable and less expensive than prior art actuation systems;

2. less sensitive to extraneous operating conditions without loss of accuracy;

3. more easily installed on aircraft;

4. less susceptible to rigging error;

5. responsive to actuator drift and wear over time without requirement for re-rigging;

6. responsive to individual actuator malfunction and/or actuator system malfunction; and 7. capable of providing additional information relative to:
   a. flap system asymmetry;
   b. flight load events; and
   c. wing strain and deflection during flight.

An actuation system in accordance with the present invention has at least one actuator attached to a structure, such as an airplane wing, and an element, such as a flap or carriage, to be moved relative to the structure. The actuator causes movement of the element along a path of travel between travel limits such as fully stowed and fully deployed positions of a wing flap. The actuator has a mode which occurs when the actuator has moved more than a fixed distance relative to a reference position, such as a non-commanded displacement of 0.03 inches of movement of an actuator which is operating a wing flap. The mode may include, without limitation, operations representing failure, detection, correction, positioning, control, etc. A position transducer in accordance with the invention, which in one preferred embodiment of the invention is a LVDT, is coupled to the structure and the element for producing an output signal representing a position of the element along the path of travel and has a position resolution error along the path of travel greater than the fixed distance. The position sensor of the present invention is less expensive than position sensors which have a resolution greater than the fixed distance over the path of travel representing a mode because the position resolution error along the path of travel does not have to be less than the fixed distance representative of the mode to detect the mode.

A processor is coupled to the output signal from the position transducer for sampling the output signal periodically a plurality of times during the movement of the element along the path of travel and in response to a plurality of samples, producing a signal indicating if a failure mode has occurred. The sampling rate of the periodic samples is chosen so that a distance that the actuator travels between successive samples times the position resolution error is less than the fixed distance representing the mode. The sampling rate is chosen to be sufficiently high that the resolution between successive samples produces a highly linear output as a consequence of the displacement of the actuator being a small fraction (e.g. less than 1%) of the total path length of travel resulting in very little, if any, variation as a consequence of actuator/position transducer geometry. In a preferred embodiment of the present invention, which is used in association with positioning of wing flaps, the distance that the actuator travels between samples times the position resolution error is less than 1% of the fixed distance and preferably, is less than 0.002% of the fixed distance.

A number of different processor operations may be performed in accordance with the present invention. The processor may compare a magnitude of each sample with another signal to produce the signal indicating if the mode has occurred. The another signal may be a magnitude of a previous sample from the same position transducer and the comparison may be a computation of a difference signal between each sample and the previous sample with an indication that the mode has occurred being produced when the computed difference exceeds a threshold. The threshold may be variable and may be a function of position and extension of the position transducer relative to the element.

A bandpass filter is utilized to filter the output of the position transducer to reject signal components having a frequency spectra which is not representative of the mode. The pass band is chosen to pass variations in the output signal of the position transducer representative only of a possible mode with other signal frequency spectra being substantially attenuated by the bandpass filter because those rejected frequency spectra are representative of non-mode events. The bandpass filter may be digital in implementation and be implemented by a microprocessor.

The actuation system in accordance with the invention may further include another actuator attached to the structure and the element to be moved relative to the structure. The another actuator also causes movement of the element along the path of travel between the travel limits relative to the structure and also, has a mode when the another actuator has moved more than the fixed distance representing the mode relative to a reference position on the path of travel during movement of the element along the path of travel between the travel limits. The another position transducer is coupled to the structure and to the element for producing an output signal representing a position of the element along the path of travel. The another position transducer also has a resolution error along the path of travel greater than the fixed distance representing the mode. The another signal may be a magnitude of a sample from the another position transducer and the comparison comprises computing a difference signal between concurrent samples from the position transducers. The difference signal may be bandpass filtered to reject frequency spectra not representative of the mode of either of the actuators. An indication that the mode has occurred is produced when the computed different signal exceeds a threshold. The threshold is variable and is a function of position and extension of the position transducers relative to the element. The bandpass filter has a pass band chosen to pass variations in the difference signal representative only of the mode. The processor may produce the signal indicating that the mode has occurred only after a computation of a plurality of successively computed difference signals exceeding the threshold has occurred.

Where a single actuator is used, the successive samples of the position transducer are compared to a reference parameter which preferably is a previous sample with the difference between the successive samples being computed. An indication that the mode has occurred is produced when a difference between the successive samples exceeds a threshold. The threshold may be varied as a function of the displacement along the path of travel to compensate for changes in the actuator/position transducer extension geometry as the actuator extends and retracts.

When parallel actuators are used to move a single element, the output signals of each position's transducer associated with each actuator which is moving the element are compared by computing a difference signal. When the difference signal between the relative positions of the parallel actuators, as sensed by the associated position transducers is computed which is greater than a threshold, the mode has occurred.

The present invention may also be used to check the integrity and operational status of the drive line for each wing for providing rotary power to the actuators which power wing flaps. In this application position transducers, which are preferably LVDT's, which are the most outboard LVDT's on each wing produce sampled output signals as described above. This implementation may use outboard position transducers in association with actuators or position transducers coupled between the structure and a carriage driving the element or directly to the element without connection to a carriage. The difference between samples produced by each outboard LVDT is computed. If the difference exceeds a threshold, the loss of integrity of the drive lines or a failure in one of the drive lines is indicated. A plurality of successive computations exceeding the threshold may be used to indicate a true failure and not a transient response. The benefit of this application of the actuation system of the present invention is that the outboard LVDT's perform dual functions of detecting drive line integrity and operational status and the functions as previously described. The use of single purpose dedicated sensors, such as RVDT's, is eliminated.

Historical data of actuator position during and after flight can be stored for analysis. The stored data is used to study where fatigue and failure of actuators and other wing components has occurred and where wing to wing asymmetry exists. Asymmetry is detected with the position samples of two pairs of actuators respectively associated with corresponding wing flaps on the wings. The computation of a difference between the differences between the position detectors associated with the pairs of actuators on both wings which are operating corresponding wing flaps may be used to indicate the aforementioned asymmetry of wing panels which is indicative of a serious flight condition.

Use of incremental monitoring of the position signals produced by position transducers associated with actuators which are moving elements, such as wing panels, effectively resets the null position to the previously detected position. This permits use of less expensive position transducers, such as LVDT's having a higher overall error rate because only a short portion of the stroke of each actuator is sensed between successive samples. Fast clocking of the increments between samples and resetting the null continuously removes potential extraneous signals caused by temperature, speed and other factors which are not relevant to actuator failure and detection.

BRIEF DESCRIPTION OF THE DRAWINGS

FIGS. 1A and 1B show a schematic view of an aircraft flap actuator in accordance with the present invention.

FIGS. 2a and 2b shows a partial schematic view of a first embodiment of a controller of FIGS. 1A and 1b.

BEST MODE FOR CARRYING OUT THE INVENTION

Figure 1B:
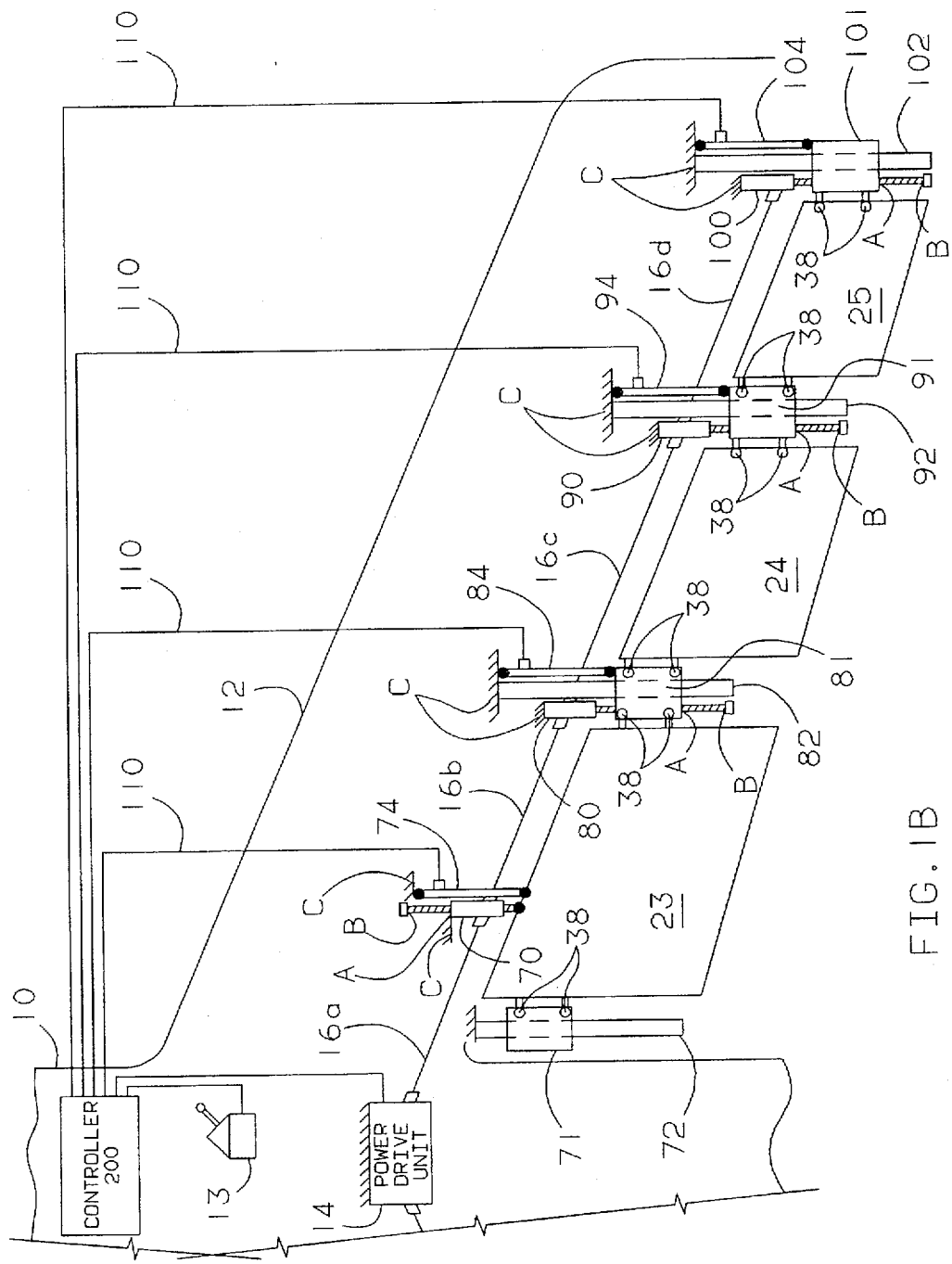

FIGS. 1A and 1B illustrate schematically a preferred embodiment of an actuator system in accordance with the present invention within an aircraft. However, it should be understood that the present invention may be used in diverse applications of actuation systems in which it is desired to obtain high positional accuracy in discriminating the position of the element being moved by the actuation system without the high expenditure necessary to obtain position transducers with high positional resolution. The components are not drawn to scale, but are simplified for ease of understanding. A preferred commercial embodiment would, for example, utilize the tracked flap actuator system supplied by Mitsubishi Heavy Industries for the Canadair Global Express Aircraft.

As shown in FIGS. 1A and 1B, an aircraft 10 is provided having left and right (port and starboard) wings 11 and 12, respectively. Each wing includes a plurality of flaps 20, 21 and 22 on wing 11 and 23, 24 and 25 on wing 12. A power drive unit 14 has an output drive line comprised of segments 15a, 15b, 15c and 15d in wing 11 and segments 16a, 16b, 16c and 16d in wing 12. The segments couple rotary power to each of a plurality of actuators 30, 40, 50 and 60 in wing 11 and 70, 80, 80 and 100 in wing 12. As will be described in more detail below, the integrity and operational status of the drive line in each wing may be obtained by sampling the output signals produced by a pair of outboard LVDT's 34 and 104 respectively in wing 11 and wing 12 and comparing the difference therein with a threshold. The LVDT's 34 and 104 preferably have the dual use of functioning as part of the actuation system, as described below, and monitoring integrity and operational status of the drivelines. However, outboard LVDT's may be used without association with the actuation system in which each LVDT is coupled to the wing and to the carriages 31 or 101 or flaps 20 or 25. A large difference between corresponding samples from the LVDT's 34 and 104 is indicative of a driveline failure or an operational status problem. Each flap is connected to two flap actuators with one actuator being on each side of a flap. Control device 13 controls activation of the actuators to control the flaps. Alternatively, a single actuator could be attached between two flaps and connected to both flaps via a carriage/track mechanism. Actuators 30 and 40 are connected to carriages 31 and 41 to drive flap 20; actuators 40 and 50 are connected to carriages 41 and 51 to drive flap 21; actuators 50 and 60 are connected to carriage 51 and directly to flap 22; actuators 70 and 80 are directly connected to flap 23 and to carriage 81; actuators 80 and 90 are connected to carriages 81 and 91 to drive flap 24 and actuators 90 and 100 are connected to carriages 91 and 101 to drive flap 25. Each flap actuator is well known and includes a number of conventional components. However, for ease of understanding only the carriage and track of each actuator are separately designated herein.

Actuator 30 is attached to a movable carriage 31 which is typically fixed to flap 20 and travels along track 32 between a fully retracted position A and a fully extended position B, corresponding respectively to the fully retracted and fully extended positions of flap 20. Actuators 40–100 are similarly associated with tracks 42, 52, 62, 72, 82, 92 and 102. LVDT's 34, 44, 54, 84, 94 and 104 are respectively connected to each actuator via carriages 31, 41, 51, 81, 91 and 101 through uniballs and links 38 which connect the flaps to the carriages. Each flap may be connected to adjacent carriages via four points with a total of seven constraints. Each LVDT is also preferably fixed to the wing via structure C. It is also necessary for each of the tracks and actuators to be fixed with respect to structure C.

Each LVDT of the present invention can, for example, have an error of ±0.5% to 1.0% over its stroke and have stroke length of 10–15 inches with no interconnecting linkage to the associated actuator. As has been explained above, sampling of LVDT output at a rate numerous times during the time required to complete a path of travel between travel limits A and B produces sequential measurements representative of small displacements relative to the length of the path of travel of the element being moved by the actuator. The possible error in position resolution in terms of distance in comparison to the fixed displacement (e.g. 0.03 inches) of the actuator relative to a reference position representing a fault mode is extremely small which, for example, may be less than 1% and preferably less than 0.005% of the fixed displacement. One such suitable LVDT is KAVLICO Corporation part number GM9547 (5910440). Output signals indicative of the length of movement of each stroke arm are provided via signal lines 110 to an analysis center or controller 200.

When driveline status of the drivelines comprised of segments 15a, 15b, 15c and 15d and 16a, 16b, 16c and 16d is being determined, the microprocessor controller 200 periodically samples output signals from the outboard LVDT's 34 and 104 and compares a difference between concurrent samples from each LVDT to a threshold. If the threshold is exceeded, then a driveline mode, such as malfunction or failure, is indicated. The sampling rate of the microprocessor of the output signals is chosen as a function of a distance that the outboard flaps travel between successive samples and the position resolution error so that sufficient resolution is provided compared to the position resolution error of the LVDT's between samples to provide a reliable indication of driveline status. The sampling rate may be chosen to be identical to the LVDT's used in association with the actuators.

Figure 2B:
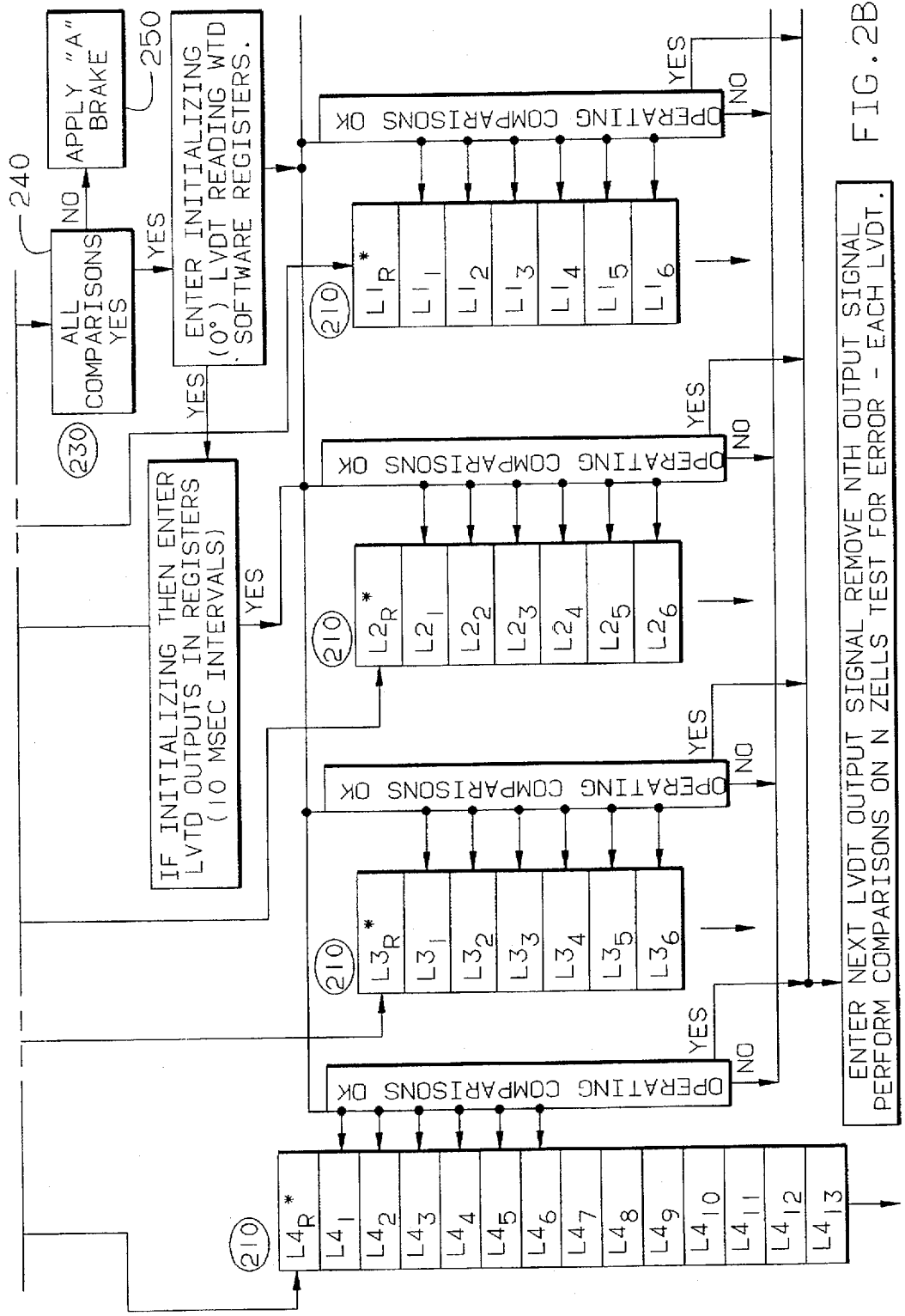

The controller 200, as illustrated in FIG. 2, preferably includes structure for (1) recording historical positions of each actuator as a function of the output signals of its associated LVDT, (2) determining current actuator position as a function of the movement signal and most previous position, (3) comparing the position changes of parallel actuators, and (4) providing a failure signal in the event actuator motion does not meet the required parameters. A variety of conventional microprocessor circuits may be used for these functions. For example, a comparison register 210 of large storage capacity for storing all of the sample values over the path of travel and historical data can be associated with each LVDT. A comparator 220 is connected to each LVDT and to register 210 to examine current and most recent position differences and a comparator 230 is connected between each adjacent LVDT to examine respective current position differences to account for gain between adjacent LVDT's. A failure signal indicator 240 is connected to comparators 230 to provide an output failure signal if any of the comparator examinations reveal a condition outside of acceptable, predetermined reference parameters. Upon receipt of such an output failure signal, the flight crew may, for example, elect to apply a flap brake as identified by block 250.

In operation, each LVDT produces an output voltage corresponding to the LVDT stroke arm position with a characteristic as indicated at the top of FIG. 2 where between small displacements produced by a high sample rate produce a highly linear response. Controller 200 examines small, incremental motions of the stroke arm over a period of time that is a fraction of the period of time of actuator movement. In a preferred embodiment, a microprocessor can be used for this purpose and the increment of time for clocking can be on the order of 10 milliseconds. Typically, stroke arm travel in that period of time is on the order of 0.010 inch for a properly functioning actuator. The error associated with the exemplary lower cost LVDT having a relatively high resolution error for this amount of travel is ±0.00005 inch. Thus, a 0.030 step or reference value representative of a mode, such as a failure mode, predetermined for a given aircraft to be indicative of an actuator operational status, such as a malfunction or fault, is readily detectable with a high margin for error because the position error is less than 1% and preferably less than 0.005% of the reference value.

Rather than comparing stroke arm position at each such examination with a fixed, initial null position, each comparator 220 preferably compares that new position with the most previously measured position. Thus, the position error between samples remains at ±0.00005 inch. In effect, the compared null position is reset with every incremental examination to the previous position. Through each register 210, controller 200 also stores a plurality of positions measured in sequence, for example, over the 10 most recent increments, to determine if a failure mode or deterioration has occurred over a broader span of time. By examining a plurality of successively computed differences to determine if the threshold fixed distance or reference value has been exceeded for a substantial period of time longer than any expected transient perturbances, the microprocessor is prevented from signalling that a fault condition has occurred which, in fact, was produced by a transient non-fault condition.

In addition to comparing the successive actuator positions to a predetermined reference value (in this case 0.03 inch) indicative of a mode such as failure, controller 200 can verify the mode through comparators 230 by the examination of the movement of adjacent actuators and/or the complete actuator system. For example, as described below in FIG. 2 if one actuator fails, there is typically additional load and elastic strain on adjacent actuators connected to the same flap(s). Thus, an indication of a failure in one actuator can be verified by detection of a small jump in movement of adjacent actuators in the same time increment. The smaller jump typically is smaller than the predetermined set distance representing failure of the actuator which has actually failed but still is detectable within the range of error for the LVDT of the present invention.

Similarly, each comparator 230 can compare the incremental change in position of each actuator in the flap system to verify that each actuator is functioning synchronously within a wing or between two wings. A cross comparison between the position of actuator pairs moving the same wing panel in different wings permits a condition of asymmetry to be determined which is a potentially serious flight condition.

Further, the present invention can advantageously include a permanent historical portion of each register 210 to store the rigged position of each actuator for given commanded flap positions at initial installation. Comparison with current actuator positions for such commanded positions at a later date is indicative of wear and drift over time. That information can be used, for example, to trigger routine maintenance and/or pre-failure inspection. Likewise, each register 210 can be enlarged (or periodically unloaded to a data storage unit) to retain a record of all actuator movement continuously throughout the flight cycle. Such information can be useful in providing actual measurement of wing stresses and deflection under various load conditions.

Since the null position for failure detection is continuously reset, it is not necessary to have precise null rigging at initial installation of the detection system in the aircraft. Instead, clearances are set in installation and during the first flight and the permanent historical portion of register 210 is filled.

Figure 3:
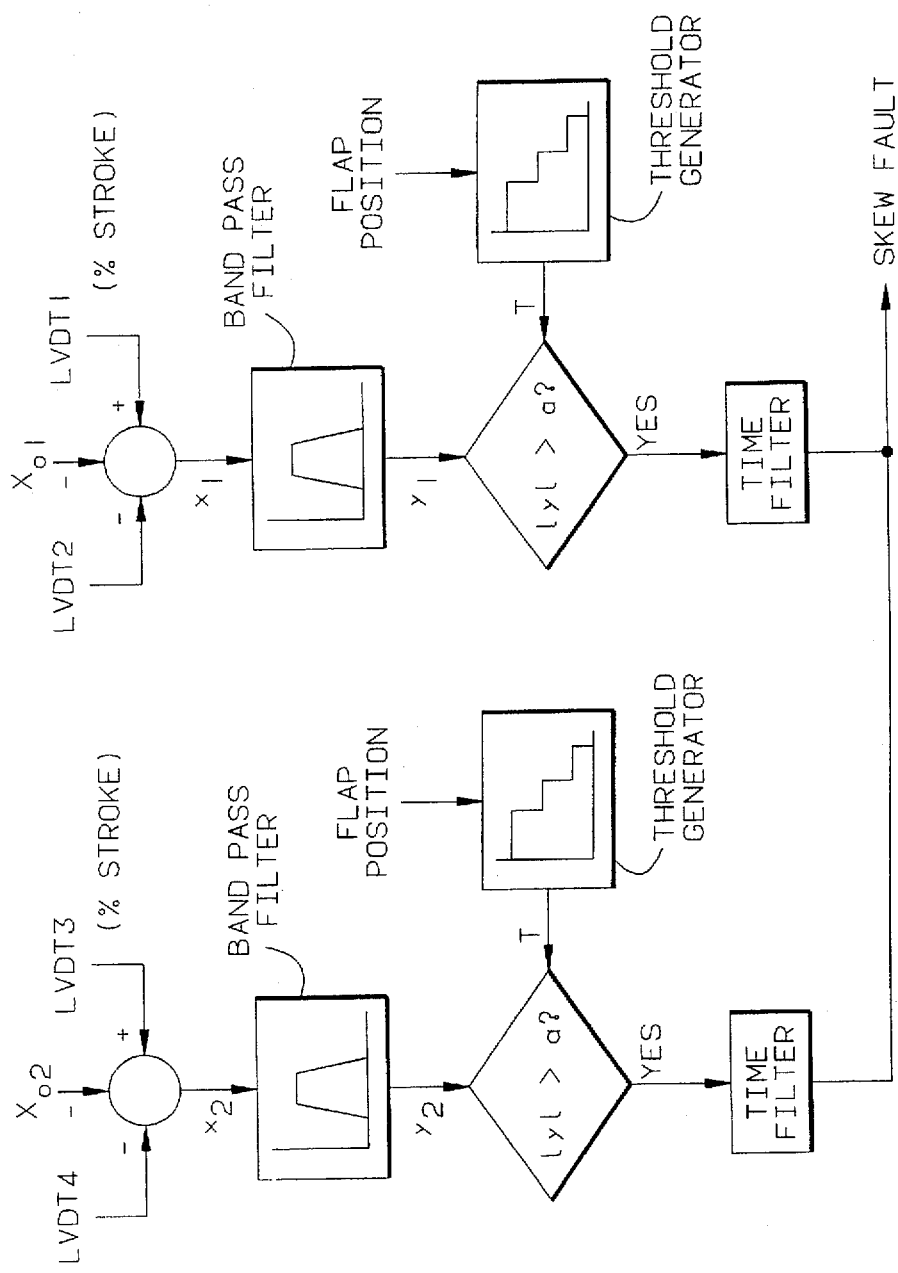
FIG. 3 shows a partial schematic of another embodiment of a controller of FIG. 1.

FIG. 3 illustrates a second embodiment of processing performed by the controller of 200 of FIG. 1. FIG. 3 illustrates the processing in terms of a flowchart which processes are programmed into a suitable microprocessor. The embodiment of FIG. 3 simplifies computationally the algorithm for performing position computations of pairs of LVDT's (position transducers) which are associated with pairs actuators which drive wing panels 20–25 of FIGS. 1A and 1B. The process of FIG. 3 also adds robustness to make it immune to disturbances and geometric variations without adding undue complexity. Furthermore, the process of FIG. 3 permits the design to be traceable in a deterministic and straightforward way to a set of fundamental design criteria as described below in conjunction with FIGS. 4–8.

The processing illustrated in FIG. 3 is implemented in a controller which is microprocessor based, such as, but not limited to, the controller 200 of FIG. 2. The algorithm of FIG. 3 computes the position of each successive output of the LVDT position transducers 34, 44, 54, 64, 74, 84, 94, 104 in the same manner as described above by sampling successive outputs over a period of time such that the movement of the associated actuators 30, 40, 50, 60, 70, 80, 90 and 100 causes the elements 20, 21, 22, 23, 24 and 25 which are being moved to move only a small portion of the path of travel between the travel limits A and B of FIGS. 1A–1B.

The detection of the failure of any actuator is determined by observing a small jump in movement of an adjacent actuator at the same time increment as described above. This small jump is computed by subtracting the output signals of LVDT's which are paired to detect the position of a single panel, such as LVDT's 34 and 44, which sense the position of panel 20.

In FIG. 3, the outputs of adjacent pairs of position transducers LVDT1, LVDT2, LVDT3 and LVDT4 each correspond to the LVDT position transducers 34, 44, 54 and 64 of FIG. 1A or 74, 84, 94 and 104 of FIG. 1B. The outputs of each of the LVDT's are sampled at a sampling interval such as, but not limited to, every 10 milliseconds as described above. The sampling of the individual LVDT outputs is performed under microprocessor control as described above.

Processing proceeds with the pairs of outputs LVDT1 and LVDT2 and LVDT3 and LVDT4 being subtracted from each other to produce respective output signals, $X_1$ and $X_2$. The output signals $X_1$ and $X_2$ are subjected to bandpass filtering which is implemented digitally within the microprocessor in accordance with a bandpass as described below. The outputs of the respective bandpass filters $Y_1$ and $Y_2$ are respectively compared to a threshold T. The comparison is such that the absolute value of the outputs $Y_1$ and $Y_2$ is compared to the threshold T to determine if the absolute value is larger than T. The value T is an input from a threshold generator which varies as a function of flap position to compensate for the geometric placement of the LVDT's with respect to the actuators which causes the LVDT's extension rate to change slowly as the actuators extend and retract. This error is normal and is accounted for by the variation of the threshold generator. The function generated by the threshold generator is uniquely modeled in accordance with the geometry of the particular system which is being controlled by an actuation system in accordance with the present invention such as, but not limited to, the control of wing flaps. If the result of the comparison of the absolute value of the outputs $Y_1$ and $Y_2$ with the threshold T is "yes", the outputs are applied to a time filter, which is implemented in the microprocessor controller, for determining if a mode such as failure has occurred after computation of a plurality of successively computed difference signals exceeding the threshold T. The number of samples to cause the output from the time filter to indicate a SKEW FAULT is a design criteria which may varied depending upon the dynamics of the particular system and the degree of monitoring which is required.

The benefit of the processing of FIG. 3 in comparison to that of FIG. 2 is that it reduces the number of computations which are required to produce an output of a fault or other condition. Only LVDT differences across flap panels are computed instead of successive computations between successive samples of the outputs of each LVDT as described above in conjunction with FIG. 2. The computation algorithm of FIG. 3 is robust with respect to load disturbances which occur on a flap panel in equal proportions with respect to the pair of LVDT's which control each panel. As has been described above, the threshold T has been provided to account for the fact that deflections tend to be larger near the stowed position of the flaps and smaller near the end of travel with a schedule of several fault thresholds having step values as a function of flap position or any other relationship for accounting for flap, actuator or LVDT geometry. The accuracy of determining flap position is not critical in this circumstance. As described above, if a plurality of unfavorable comparisons result from the time filter, then a SKEW FAULT is generated by the controller.

Figure 4:
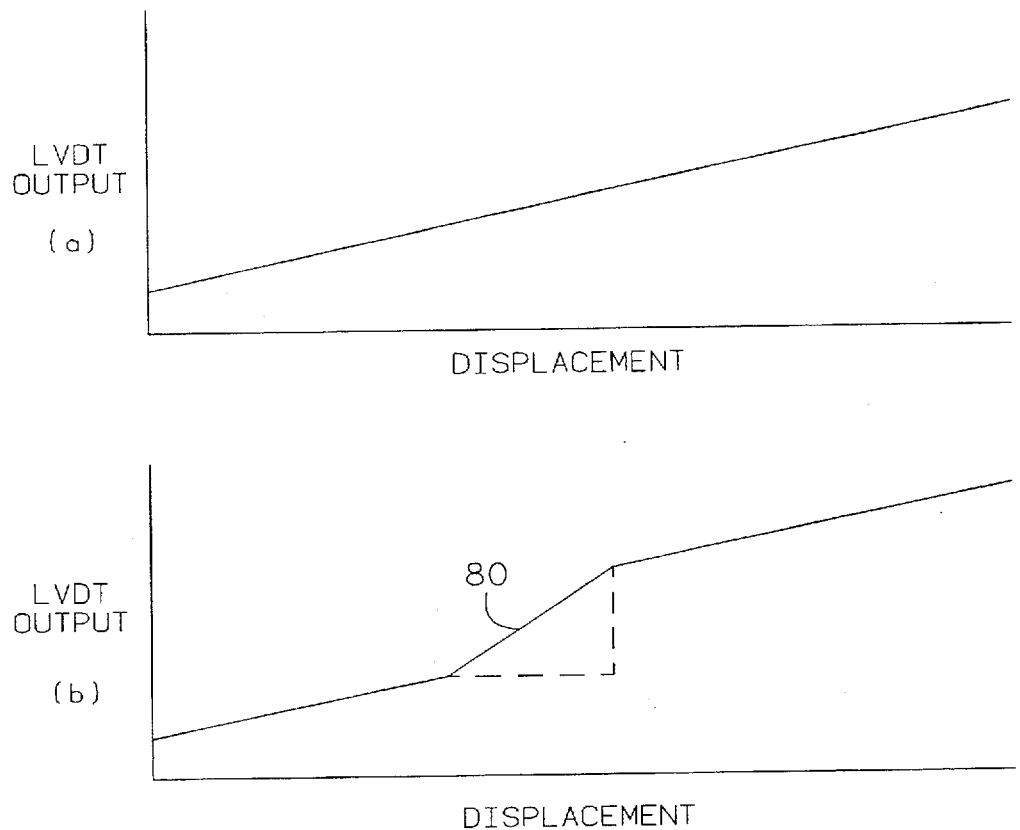
FIG. 4 illustrates LVDT output as a function of displacement for normal operation and during a failure mode of the actuator.

FIG. 4 illustrates a normal and a fault condition output from a LVDT. As illustrated in FIG. 4A, under normal operation the LVDT output is a linear function of displacement when operation of the actuator is correct. As illustrated in FIG. 4B, LVDT output undergoes a jump in a non-linear fashion which has an increased rate of change during the time interval during which the fault or other mode is occurring as is identified by reference numeral 80.

Figure 5:
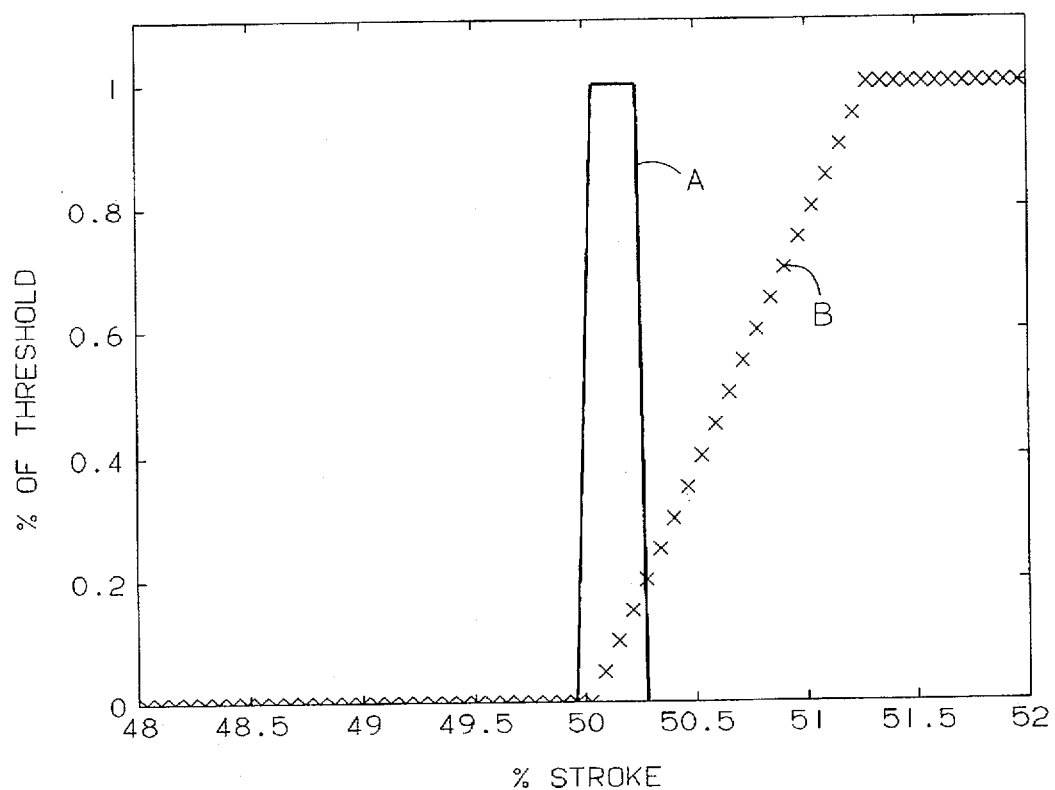
FIG. 5 illustrates actuator movement of the type which should be analyzed and actuator movement of the type which should be rejected in the analysis of the output signals from samples of the position transducers.

FIG. 5 illustrates a graph of percentage of threshold with the threshold being the set distance of movement of the actuator representative of a failure mode versus a percentage of stroke. The stroke is the total path of travel of the element being moved by the actuator between the travel limits such as between points A and B above. Step function A is a disturbance which the bandpass filter of the system must reject because it is not representative of a true failure or other mode. On the other hand, the characteristic B represents a mode which is representative of a potential failure which, as illustrated, spans approximately 1% of the stroke between samples.

Figure 6:
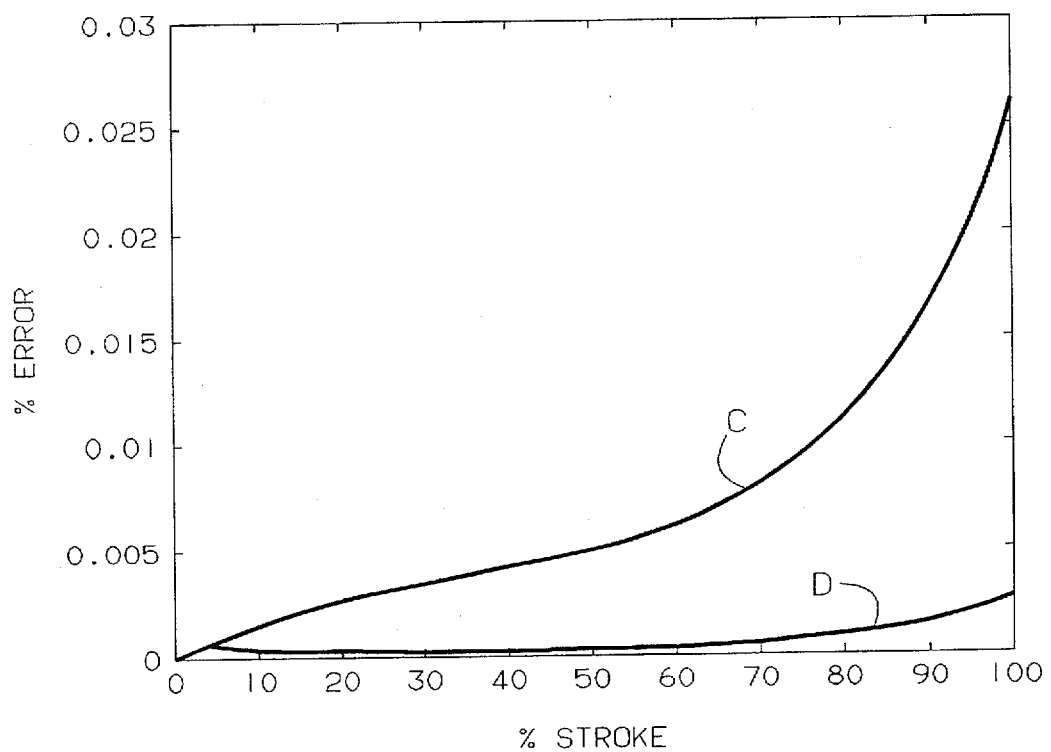
FIG. 6 illustrates the effect of non-parallel placement of position transducers relative to an actuator during extension at varying rates which introduce error which should be compensated for by the controller.

FIG. 6 illustrates the output error of a LVDT on adjacent sides of a wing panel versus percentage of stroke. The non-parallel placement of LVDT pairs, such as pairs 34 and 44, 54 and 64, 74 and 84, and 94 and 104, respectively, in FIGS. 1A and 1B, results in the outputs from different LVDTs extending at varying rates as represented respectively by curves C and D. The slowly varying error represented by curves C and D must be accommodated by the controller 200 but does not preferably require the storing of historical data.

Figure 7:
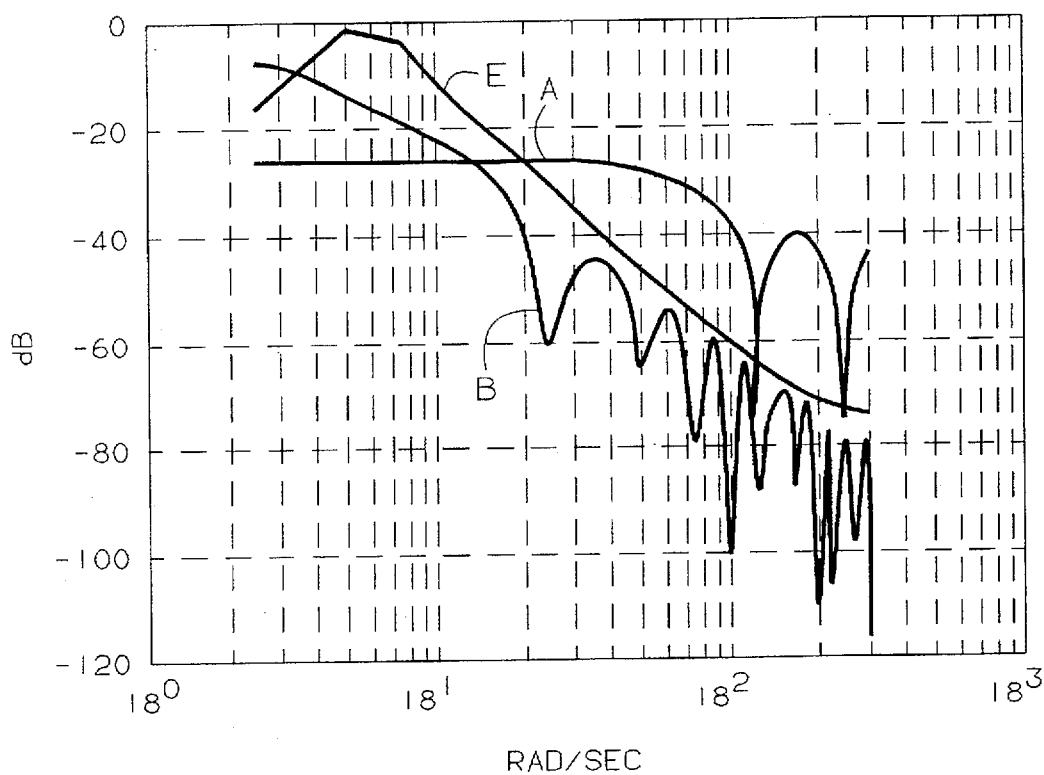
FIG. 7 illustrates a graph in the frequency domain of a desired bandpass characteristic of a bandpass filter used for attenuating undesirable frequency components not indicative of a failure mode in accordance with the present invention.

FIG. 7 illustrates a translation into the frequency domain on a log-log scale of dB versus radians per second where A represents the response produced by the step function A of FIG. 5 and curve B represents the response produced by the characteristic B of FIG. 5. Curve E represents the desired result of bandpass filtering.

Figure 8:
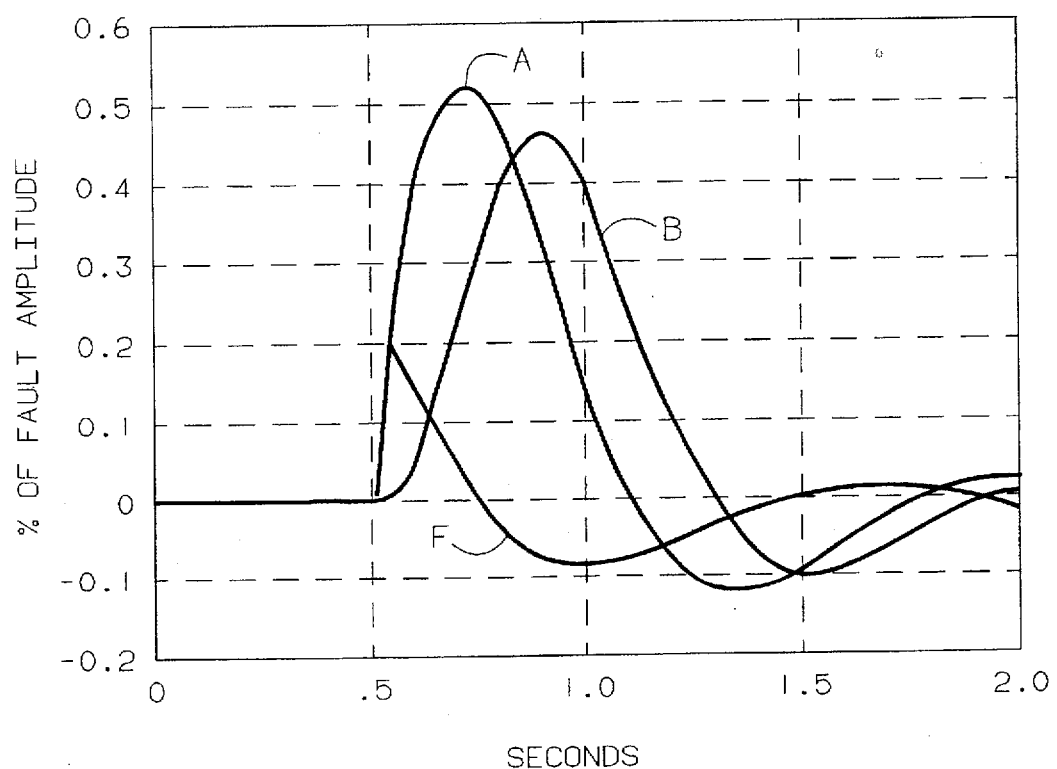
FIG. 8 illustrates a graph of a percentage of fault amplitude relative to a fault threshold as a function of time of the bandpass filter.

FIG. 8 illustrates a graph of percentage of fault amplitude versus seconds illustrating the threshold T of the output of the filter of FIG. 3 which is set at 0.4 of the set distance of movement representing a failure or other mode. Curve A represents the response to the step function A of FIG. 5; curve B represents the response to characteristic B of FIG. 5 and curve F represents a response characteristic which the system must reject because it does not represent a condition representative of a failure or other mode.

The selection of a suitable bandpass characteristic based upon the above-described relationship of FIGS. 4–8 will result in the bandpass filter passing the characteristic B while rejecting other inputs from non-failure mode conditions so that the comparison to the threshold of FIG. 3 represented by a 0.4% of Fault Amplitude is only performed in the appropriate types of circumstances in which the system dynamics are properly being tested for conditions representative of a true fault instead of a condition which represents a non-fault condition.

The use of transducers with a microprocessor has a wider commercial use when transducer characteristics are captured for current and historical reference. A transducer, such as an LVDT, can have a large and nonlinear output voltage versus stroke variation from LVDT to LVDT. At the same time, any particular LVDT will display a very high degree of repeatability of output voltage versus stroke. Capturing a LVDT's specific output voltage versus stroke in microprocessor memory as a calibration correction will produce accurate linearity over the full stroke of the LVDT. Subsequent capture of the LVDT characteristic can be used, for example by maintenance, to detect system deterioration or drift when compared to previously captured historical characteristic(s).

While the present invention has been described in terms of its preferred embodiments, it should be understood that numerous modifications may be made thereto without departing from the spirit and scope of the invention. It is intended that all such modifications fall within the scope of the appended claims.

We claim:

1. An actuation system comprising:

an actuator attached to a structure and an element to be moved relative to the structure, the actuator causing movement of the element along a path of travel between travel limits relative to the structure and having a failure mode when the actuator has moved more than a fixed distance relative to a reference position on the path of travel;

a position transducer, coupled to the structure and to the element, for producing an output signal representing a position of the element along the path of travel, the position transducer having a position resolution error along the path of travel greater than the fixed distance;

a processor, coupled to the output signal, for sampling the output signal periodically a plurality of times during the movement of the element along the path of travel and in response to samples producing a signal indicating if a failure mode has occurred; and wherein a sampling rate of the periodic samples is chosen so that a distance that the actuator travels between successive samples times the position resolution error is less than the fixed distance.

2. An actuation system in accordance with claim 1 wherein:

the structure is a wing of an airframe;
the element is a wing panel; and
the position transducer is a linear variable displacement transducer.

3. An actuation system in accordance with claim 1 wherein:

the processor compares a magnitude of each sample with another signal to produce the signal indicating if a failure mode has occurred.

4. An actuation system in accordance with claim 3 wherein:

the another signal is a magnitude of a previous sample and the comparison comprises computing a difference signal between each sample and the previous sample; and an indication that the failure mode has occurred is produced when the computed difference signal exceeds a threshold.

5. An actuation system in accordance with claim 4 wherein:

the threshold is variable and is a function of position of the element and extension of the position transducer relative to the element.

6. An actuation system in accordance with claim 1 further comprising:

a bandpass filter; and wherein the output signal from the position transducer is coupled to the bandpass filter and the bandpass filter has a pass band chosen to pass signal variations in the output signal of the position transducer representative of the failure mode and to reject signal variations not representative of a failure mode.

7. An actuation system in accordance with claim 2 further comprising:

a bandpass filter; and wherein the output signal from the position transducer is coupled to the bandpass filter and the bandpass filter has a pass band chosen to pass signal variations in the output signal of the position transducer representative of the failure mode and to reject signal variations not representative of a failure mode.

8. An actuation system in accordance with claim 3 further comprising:

a bandpass filter; and wherein the output signal from the position transducer is coupled to the bandpass filter and the bandpass filter has a pass band chosen to pass signal variations in the output signal of the position transducer representative of the failure mode and to reject signal variations not representative of a failure mode.

9. An actuation system in accordance with claim 4 further comprising:

a bandpass filter; and wherein the output signal from the position transducer is coupled to the bandpass filter and the bandpass filter has a pass band chosen to pass signal variations in the output signal of the position transducer representative of the failure mode and to reject signal variations not representative of a failure mode.

10. An actuation system in accordance with claim 5 further comprising:

a bandpass filter; and wherein the output signal from the position transducer is coupled to the bandpass filter and the bandpass filter has a pass band chosen to pass signal variations in the output signal of the position transducer representative of the failure mode and to reject signal variations not representative of a failure mode.

11. An actuation system in accordance with claim 1 further comprising:

another actuator attached to the structure and to the element to be moved relative to the structure, the another actuator also causing movement of the element along the path of travel between the travel limits relative to the structure and also having a failure mode when the another actuator has moved more than the fixed distance relative to a reference position on the path of travel during movement of the element along the path of travel between the travel limits;

another position transducer, coupled to the structure and to the element for producing an output signal representing a position of the element along the path of travel, the another position transducer also having a resolution error along the path of travel greater than the fixed distance; and wherein the another signal is a magnitude of a sample from the another position transducer and the comparison comprises computing a difference signal between samples from the position transducers; and an indication that the failure mode has occurred is produced when the computed difference signal exceeds a threshold.

12. An actuation system in accordance with claim 11 wherein:

the threshold is variable and is a function of position of the element and extension of the position transducers relative to the element.

13. An actuation system in accordance with claim 12 wherein:

the structure is a wing of an airframe;

the element is a wing panel; and the position transducers are a linear variable displacement transducer.

14. An actuation system in accordance with claim 11 further comprising:

a bandpass filter; and wherein the difference signal is coupled to a bandpass filter and the bandpass filter has a bandpass chosen to pass variations in the difference signal representative of the failure mode and to reject signal variations not representative of a failure mode.

15. An actuation system in accordance with claim 12 further comprising:

a bandpass filter; and wherein the difference signal is coupled to a bandpass filter and the bandpass filter has a bandpass chosen to pass variations in the difference signal representative of the failure mode and to reject signal variations not representative of a failure mode.

16. An actuation system in accordance with claim 13 further comprising:

a bandpass filter; and wherein the difference signal is coupled to a bandpass filter and the bandpass filter has a bandpass chosen to pass variations in the difference signal representative of the failure mode and to reject signal variations not representative of a failure mode.

17. An actuation system in accordance with claim 4 further comprising:

the processor produces the signal indicating that the failure mode has occurred only after computation of a plurality of successively computed difference signals exceeding the threshold has occurred.

18. An actuation system in accordance with claim 5 further comprising:

the processor produces the signal indicating that the failure mode has occurred only after computation of a plurality of successively computed difference signals exceeding the threshold has occurred.

19. An actuation system in accordance with claim 9 further comprising:

the processor produces the signal indicating that the failure mode has occurred only after computation of a plurality of successively computed difference signals exceeding the threshold has occurred.

20. An actuation system in accordance with claim 10 further comprising:

the processor produces the signal indicating that the failure mode has occurred only after computation of a plurality of successively computed difference signals exceeding the threshold has occurred.

21. An actuation system in accordance with claim 14 further comprising:

the processor produces the signal indicating that the failure mode has occurred only after computation of a plurality of successively computed difference signals exceeding the threshold has occurred.

22. An actuation system in accordance with claim 15 further comprising:

the processor produces the signal indicating that the failure mode has occurred only after computation of a plurality of successively computed difference signals exceeding the threshold has occurred.

23. An actuation system in accordance with claim 16 further comprising:

the processor produces the signal indicating that the failure mode has occurred only after computation of a plurality of successively computed difference signals exceeding the threshold has occurred.

24. An actuator system in accordance with claim 1 wherein:

the distance that the actuator travels between samples times the position resolution error is less than 1% of the fixed distance.

25. An actuator system in accordance with claim 1 wherein:

the distance that the actuator travels between samples times the position resolution error is less than 0.002% of the fixed distance.

26. An actuation system in accordance with claim 3 further comprising:

a first driveline for applying rotary power to the actuator with the structure being a first wing;

a second wing and a second driveline;

another actuator attached to the second wing driven by the second driveline and to another element to be moved relative to the second, the another actuator causing movement of the another element along the path of travel between the travel limits relative to the second wing and having a failure mode when the another actuator has moved more than the fixed distance relative to a reference position on the path of travel during movement of the another element along the path of travel between the travel limits;

another position transducer, coupled to the second wing and to the another element for producing an output signal representing a position of the another element along the path of travel, the another position transducer also having a resolution error along the path of travel greater than the fixed distance; and wherein the another signal is a magnitude of a sample from the another position transducer and the comparison comprises computing a difference signal between samples from the position transducers; and an indication that the failure mode has occurred is produced when the computed difference signal exceeds a threshold and represents a condition of one of the drive shafts.

27. An actuation system in accordance with claim 26 wherein:

the threshold is variable and is a function of position of the element and extension of the position transducers relative to the element.

28. An actuation system in accordance with claim 26 further comprising:

a bandpass filter; and wherein the difference signal is coupled to the bandpass filter and the bandpass filter has a bandpass chosen to pass variations in the difference signal representative of the failure mode and to reject signal variations not representative of a failure mode.

29. A system comprising:

a first wing including a first outboard flap;

a first driveline coupled to the first outboard flap for driving the first outboard flap along a path of travel between travel limits, the first driveline having a failure mode when the first driveline has moved more than a fixed distance relative to a reference position on the path of travel;

a second wing including a second outboard flap;

a second driveline coupled to the second outboard flap for driving the second outboard flap along a path of travel between travel limits, the second driveline having a failure mode when the second driveline has moved more than a fixed distance relative to a reference position on the path of travel;

a first position transducer, coupled to the first wing and to the first outboard flap, for producing an output signal representing a position of the first outboard flap along the path of travel, and a second position transducer, coupled to the second wing and to the second outboard flap, for producing an output signal representing a position of the second outboard flap along the path of travel, the position transducers having a position resolution error along a total length of the path of travel; and a processor, coupled to the output signals, for sampling the output signals periodically from the first and second position transducers a plurality of times during the movement of the first and second outboard flaps along the path of travel and in response to samples from the first and second position transducers producing a signal indicating if a mode in either of the first and second drivelines has occurred, the periodic sampling of the output signals occurring at a rate chosen such that distances that the first and second drivelines travel between successive samples multiplied by their respective position resolution errors is less than their respective fixed distances.

30. A system comprising:

a first wing including a first outboard flap;

a first driveline coupled to the first outboard flap for driving the first outboard flap along a path of travel between travel limits;

a second wing including a second outboard flap;

a second driveline coupled to the second outboard flap for driving the second outboard flap along a path of travel between travel limits;

a first position transducer, coupled to the first wing and to the first outboard flap, for producing an output signal representing a position of the first outboard flap along the path of travel and a second position transducer, coupled to the second wing and to the second outboard flap, for producing an output signal representing a position of the second outboard flap along the path of travel, the position transducers having a position resolution error along a total length of the path of travel; and a processor, coupled to the output signals, for sampling the output signals periodically from the first and second position transducers a plurality of times during the movement of the first and second outboard flaps along the path of travel and in response to samples from the first and second position transducers producing a signal indicating if a mode in either of the first and second drivelines has occurred;

the signal being an indication of a driveline failure in one of the first and second drivelines, a difference between concurrent samples of the first and second position transducers being computed, and when the difference is greater than a threshold the indication is a driveline failure.

* * * * *